United States Patent
Spelter et al.

(10) Patent No.: US 10,668,410 B2
(45) Date of Patent: *Jun. 2, 2020

(54) FUEL FILTER COMPRISING A FUEL FILTER INSERT WITH A PREFILTER ELEMENT AND A MAIN FILTER ELEMENT

(71) Applicant: MANN+HUMMEL GmbH, Ludwigsburg (DE)

(72) Inventors: Lars Spelter, Ditzingen (DE); Idriss Razgani, Ludwigsburg (DE); Jonas Eble, Erlenbach (DE); Christoph Baumann, Moeglingen (DE); Christopher Mueller, Ludwigsburg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 311 days.

This patent is subject to a terminal disclaimer.

(21) Appl. No.: 15/703,146

(22) Filed: Sep. 13, 2017

(65) Prior Publication Data

US 2018/0008912 A1 Jan. 11, 2018

Related U.S. Application Data

(63) Continuation of application No. PCT/EP2016/054738, filed on Mar. 7, 2016.

(30) Foreign Application Priority Data

Mar. 15, 2015 (DE) ........................ 10 2015 003 165

(51) Int. Cl.
*B01D 29/21* (2006.01)
*F02M 37/24* (2019.01)
(Continued)

(52) U.S. Cl.
CPC ............ *B01D 29/21* (2013.01); *B01D 29/58* (2013.01); *B01D 35/26* (2013.01); *B01D 36/003* (2013.01);
(Continued)

(58) Field of Classification Search
CPC .. B01D 35/26; B01D 36/003; B01D 2201/46; B01D 2201/40; B01D 2201/34;
(Continued)

(56) References Cited

U.S. PATENT DOCUMENTS 2,098,725 A * 11/1937 Hurn ...................... B01D 35/16
                                                           210/132
3,312,350 A * 4/1967 Kasten ................. B01D 35/005
                                                           210/307

(Continued)

FOREIGN PATENT DOCUMENTS

DE    202006004527 U1    8/2007
DE    102008048228 A1    1/2010
(Continued)

*Primary Examiner* — David C Mellon
(74) *Attorney, Agent, or Firm* — James Hasselbeck (57) ABSTRACT

A fuel filter has a filter housing and a fuel filter insert exchangeably arranged in the filter housing and provided with a prefilter element and a main filter element. Prefilter element and main filter element are positioned one behind the other in the filter housing in axial direction of the filter housing. A fuel discharge channel is arranged in the filter housing below the fuel filter insert. In operating position of the fuel filter insert in the filter housing, the raw sides of prefilter element and of main filter element are sealed relative to the fuel discharge channel by seal-tight contact of the fuel filter insert on the filter housing. The raw side of the main filter element, when the fuel filter insert is moved by (Continued)

axial movement away from the operating position, is fluidically connected with the fuel discharge channel via the raw side of the prefilter element.

19 Claims, 3 Drawing Sheets

(51) Int. Cl.
  *F02M 37/44* (2019.01)
  *B01D 35/26* (2006.01)
  *B01D 36/00* (2006.01)
  *B01D 29/58* (2006.01)

(52) U.S. Cl.
  CPC ............ *F02M 37/24* (2019.01); *F02M 37/44* (2019.01); *B01D 2201/295* (2013.01); *B01D 2201/298* (2013.01); *B01D 2201/34* (2013.01); *B01D 2201/40* (2013.01); *B01D 2201/46* (2013.01)

(58) Field of Classification Search
  CPC ........ B01D 2201/298; B01D 2201/295; B01D 29/50; B01D 29/56; B01D 29/58; B01D 35/005; B01D 17/04; B01D 17/045; B01D 17/10; B01D 17/2201; B01D 17/20; B01D 17/202; B01D 17/291; B01D 17/295; B01D 17/298; B01D 17/34; B01D 17/342; B01D 17/347; B01D 36/001; B01D 29/21; F02M 37/24; F02M 37/44; F02M 37/32; F02M 37/42; F02M 37/22

See application file for complete search history.

(56) References Cited

U.S. PATENT DOCUMENTS

| | | | |
|---|---|---|---|
| 3,390,778 A * | 7/1968 | Uhen | B01D 27/148 210/314 |
| 3,900,400 A | 8/1975 | Whitfield | |
| 5,017,285 A | 5/1991 | Janik et al. | |
| 5,766,468 A | 6/1998 | Brown et al. | |
| 7,285,149 B2 * | 10/2007 | Fornof | B60T 17/004 123/196 A |
| 2005/0155585 A1 | 7/2005 | Bradford | |
| 2008/0135469 A1 * | 6/2008 | Fremont | B01D 29/21 210/234 |
| 2008/0197060 A1 * | 8/2008 | Girondi | B01D 29/114 210/86 |
| 2010/0314303 A1 * | 12/2010 | Reyinger | B01D 29/21 210/130 |
| 2011/0203982 A1 | 8/2011 | Braunheim | |
| 2017/0204821 A1 * | 7/2017 | Willems | B01D 36/003 |

FOREIGN PATENT DOCUMENTS

| | | |
|---|---|---|
| EP | 1260260 A1 | 11/2002 |
| WO | 2006070221 A1 | 7/2006 |
| WO | 2007110049 A1 | 10/2007 |

* cited by examiner

FUEL FILTER COMPRISING A FUEL FILTER INSERT WITH A PREFILTER ELEMENT AND A MAIN FILTER ELEMENT

CROSS-REFERENCE TO RELATED APPLICATIONS

This application is a continuation application of international application No. PCT/EP2016/054738 having an international filing date of 7 Mar. 2016 and designating the United States, the international application claiming a priority date of 13 Mar. 2015, based on prior filed German patent applications No. 10 2015 003 165.1, the entire contents of the aforesaid international application and the aforesaid German patent application being incorporated herein by reference.

BACKGROUND OF THE INVENTION

The invention concerns a fuel filter with a filter housing and with a filter insert, arranged exchangeably in the filter housing, with a prefilter element and with a main filter element which are arranged, positioned one behind the other, in the filter housing in the direction of the longitudinal axis. The invention concerns moreover a fuel filter insert.

DE 10 2008 048 228 A9 and U.S. Pat. No. 3,900,400 B each disclose a filter with a prefilter element and with a main filter element which are arranged concentrically to the longitudinal axis of the fuel filter or positioned one behind the other in axial direction. A further fuel filter with two filter elements that are positioned atop each other and are fluidically connected in series is disclosed in EP 0 852 158 A1.

WO 2006/070221 A1 discloses a further fuel filter with a prefilter element and a main filter element which are arranged concentric relative to the longitudinal axis of the fuel filter.

Similar fuel filters are disclosed in DE 20 2006 004 527 U1 and EP 1 485 605 B1.

The fuel filter inserts of fuel filters must be exchanged in certain intervals, in case they are not constructed as lifetime components. The known filters exhibit a complex configuration of their filter housing and enable only a cumbersome exchange of the filter insert. When exchanging the filter insert, a large quantity of contaminated fuel remains in the filter housing after its removal from the filter housing so that the filter insert exchange is made difficult. Moreover, an introduction of contaminated, i.e., unfiltered, fuel into the clean side of the filter housing may occur. This can cause impairment of or damage to an injection system or internal combustion engine connected to the filter.

SUMMARY OF THE INVENTION

Object of the invention is therefore to provide a fuel filter of the aforementioned kind and a fuel filter insert which enable a simplified and reliable exchange of the fuel filter insert and can be produced in a simple and cost-efficient way at the same time.

The object concerning the fuel filter is solved by a fuel filter comprising a filter housing; a fuel filter insert, exchangeably arranged in the filter housing, with a prefilter element and with a main filter element which are arranged in the filter housing, positioned one behind the other, in the direction of the longitudinal axis of the filter housing; and a fuel discharge channel arranged in the filter housing below the fuel filter insert, wherein, in operating position of the fuel filter insert in the filter housing, a respective raw side of the prefilter element and of the main filter element are sealed relative to the fuel discharge channel by seal-tight contact of the fuel filter insert on the filter housing, and wherein the raw side of the main filter element, by an axially oriented movement of the fuel filter insert away from its operating position in the filter housing, is fluidically connectable with the fuel discharge channel via the raw side of the prefilter element.

The fuel filter insert according to the invention for a fuel filter as described above comprises a prefilter element and a main filter element which are arranged, positioned one behind the other, in the direction of the longitudinal axis of the fuel filter insert.

Further embodiments of the invention are disclosed in the description as well as in the claims.

The fuel filter according to the invention is characterized by a fuel discharge channel which is arranged below the fuel filter insert in the filter housing, wherein, in operating position of the fuel filter insert in the filter housing, a respective raw side of the prefilter element and of the main filter element is sealed relative to the fuel discharge channel by a seal-tight contact of the fuel filter insert on the filter housing and wherein the raw side of the main filter element, by an axially oriented movement of the fuel filter insert out of its operating position in the filter housing, is fluidically connectable via the raw side of the prefilter element with the fuel discharge channel. Raw side is to be understood, respectively, as the filter housing volume which is arranged fluidically upstream of a filter medium of the respective filter element in which the fuel to be passed through the filter medium is arranged. The fuel filter according to the invention enables a simplified, safe exchange of the fuel filter element. By draining the fuel arranged at the raw side into the fuel discharge channel, an introduction of contaminated fuel into the clean side of the main filter element, i.e., the flow regions of the fuel filter for the fuel that has been filtered by both filter elements, is counteracted. Upon exchange of the fuel filter insert, the latter can drain before the fuel filter insert is completely removed from the filter housing. In this way, an undesirable soiling of the environment of the fuel filter can be counteracted.

For a particularly simple configuration of the fuel filter, the fuel discharge channel according to the invention is connected fluidically preferably with a fuel return of the filter housing. Such a fuel return is required anyway in today's fuel filters and serves for returning the fuel to a fuel tank. In this way, an additional fuel discharge opening in the filter housing is not required. It is important in this context that the fuel contained in the fuel discharge channel can completely flow out of it solely by the force of gravity.

According to a preferred embodiment of the invention, the fuel filter insert in its installation position in the filter housing is seal-tightly contacting the filter housing with at least one end disc of the main filter element and at least one sealing element, preferably two sealing elements, of the prefilter element, respectively.

For a particularly simple constructive configuration of the fuel filter as well as a simplified insertion of the fuel filter insert into the filter housing, the filter housing can comprise a filter cup with an inner diameter which is tapering in a stepwise manner from an insertion opening of the filter housing in the direction of its bottom region.

In this way, the filter housing in the region of its inner wall can form sealing surface sections for the seal-tight contact of the end discs of the fuel filter insert; with increasing spacing from the insertion opening of the filter housing in the direction toward the housing bottom, the sealing surface sections are less far spaced from the longitudinal axis of the fuel filter element. In a corresponding manner, the sealing elements of the lower end disc of the main filter element as well as of the two end discs of the prefilter element are in this case differently spaced relative to the longitudinal axis of the fuel filter insert and are resting seal-tightly against the sealing surface sections in the operating state of the fuel filter in the filter housing. In this way, the fuel filter insert can be inserted into its operating position in the filter housing without an unnecessary overstressing of its sealing elements due to friction at the inner housing wall.

According to the invention, in axial direction between the prefilter element and the main filter element, a (radial) flow channel for the fuel prefiltered by the prefilter element can be arranged which is immediately delimited in axial direction by end discs, correlated with each other, of the prefilter element and of the main filter element. The filter housing comprises in this case preferably a lateral fuel outlet by means of which the flow channel can be fluidically connected with a fuel pump in order to pump the prefiltered fuel through a fuel inlet of the filter housing to the main filter element. The flow channel is preferably configured in an annular shape relative to the longitudinal axis of the fuel filter insert.

Handling of the fuel filter insert can be even further simplified in that the two end discs of the prefilter element and of the main filter element which delimit the flow channel are connected to each other for common removal, in particular are embodied together as one piece. This provides also manufacturing technological advantages and enables a particularly favorable manufacture of the fuel filter. Moreover, the filter housing can be embodied with a further simplified configuration, in particular without housing-associated separated chambers.

In a constructively simplest case, a low-pressure region comprising the prefilter element and a high-pressure region comprising the main filter element of the fuel filter are at least over sections thereof separated from each other by a wall element that is extending from the main filter element in axial direction at least partially through the prefilter element. According to the invention, the wall element can be formed integrally with one end on an end disc of the main filter element.

According to the invention, the main filter element of the fuel filter insert can comprise a water separating unit for separating water contained in the fluid. In this way, an internal combustion engine operated with the fuel or a fuel injection device can be reliably protected from a potentially damaging water content of the fuel.

The water separating unit of the main filter element comprises preferably a water separating gap which is fluidically connected with one end to a water discharge channel which is extending in axial direction at least with sections thereof through the prefilter element. By means of the water discharge channel the water that has been separated from the fuel can be discharged and can thus be supplied, for example, to a water collecting chamber of the filter housing. The water separating gap can be in particular arranged between a filter medium of the main filter element and a screen tube that is functioning as a final separator.

The water discharge channel is delimited in radial direction outwardly preferably by the aforementioned wall element which can be formed integrally on the end disc of the main filter element that is delimiting the flow channel.

According to the invention, the water discharge channel comprises preferably a wall that is fluid-tight as a whole, i.e., across its entire length, in order to provide an additional calming zone in which the water that has been separated from the fuel can precipitate in downward direction, following the force of gravity. According to an embodiment of the invention, the water discharge channel in this context can be delimited in radial direction at the inner side by a tubular element that is part of a venting tube which is arranged, preferably centrally, in the interior of the fluid filter or part of a screen tube of the water separating unit. No separate components are required in this way despite the water separating functionality of the fuel filter insert, and the size of the fuel filter remains untouched.

The venting tube according to one embodiment of the invention is fastened (permanently) to the filter housing and can be in particular locked thereto or screwed on. In case of an exchange of the prefilter element and main filter element, the venting tube in the sense of a lifetime component thus remains in the filter housing. This provides cost advantages and saves resources.

The venting tube can axially project with its inlet opening past an upper end disc of the main filter element or can end flush with the upper end disc of the main filter element or substantially flush therewith. In this way, a reliable venting of the main filter element is ensured.

The venting tube opens with the other end preferably in the afore described fuel return of the filter housing through which the fuel can be returned to the fuel tank. The venting tube can be provided in this context with a throttle in order to counteract a retrograde introduction of contaminants into the region of the main filter element.

According to the invention, with regard to a separation as efficient as possible of water contained in the fuel, the water separating unit can comprise a coalescing medium. The coalescing medium, for the purpose of a separating efficiency as great as possible, can be arranged fluidically downstream of a filter medium of the main filter element. The coalescing medium, as needed, can be configured as a single layer or multi-layered.

The aforementioned wall element delimits preferably together with an end disc of the prefilter element that is facing away from the main filter element, i.e., the lower end disc of the prefilter element, a receiving slot into which a housing socket or water discharge socket of the filter housing is extending in axial direction. The lower end disc of the prefilter element as well as the wall element each can be provided for this purpose with an (elastomeric) sealing element.

As an alternative to the embodiment of a receiving slot, the wall element can be seal-tightly connected to the lower end disc. The sealing action on a housing socket or water discharge socket in this case can be realized e.g. by a sealing element which is arranged in radial direction inwardly on the wall element.

DETAILED DESCRIPTION

Figure 1:
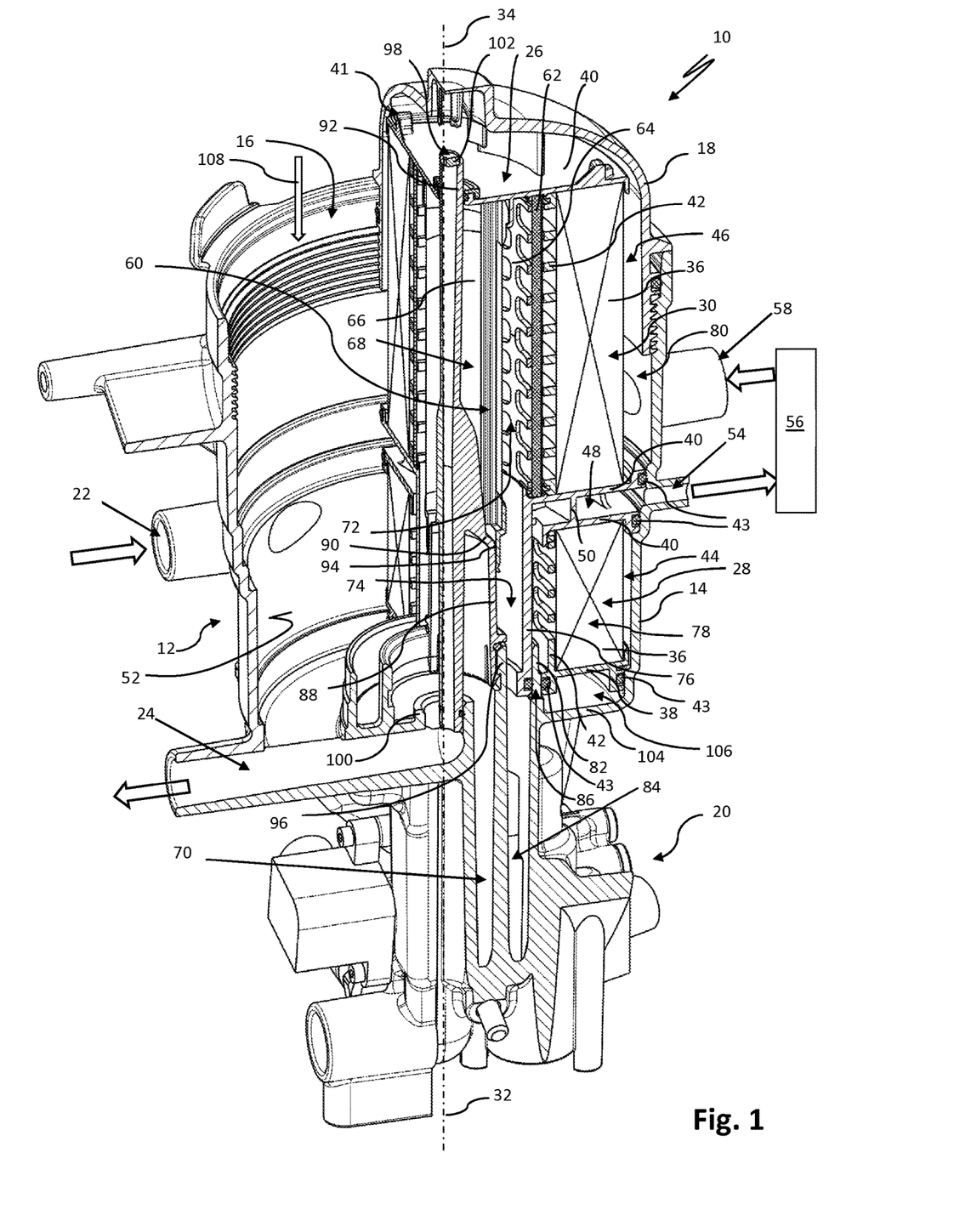
FIG. 1 shows in a perspective section illustration a fuel filter with a filter housing and a filter insert arranged therein and comprising a prefilter element and a main filter element.
Figure 2:
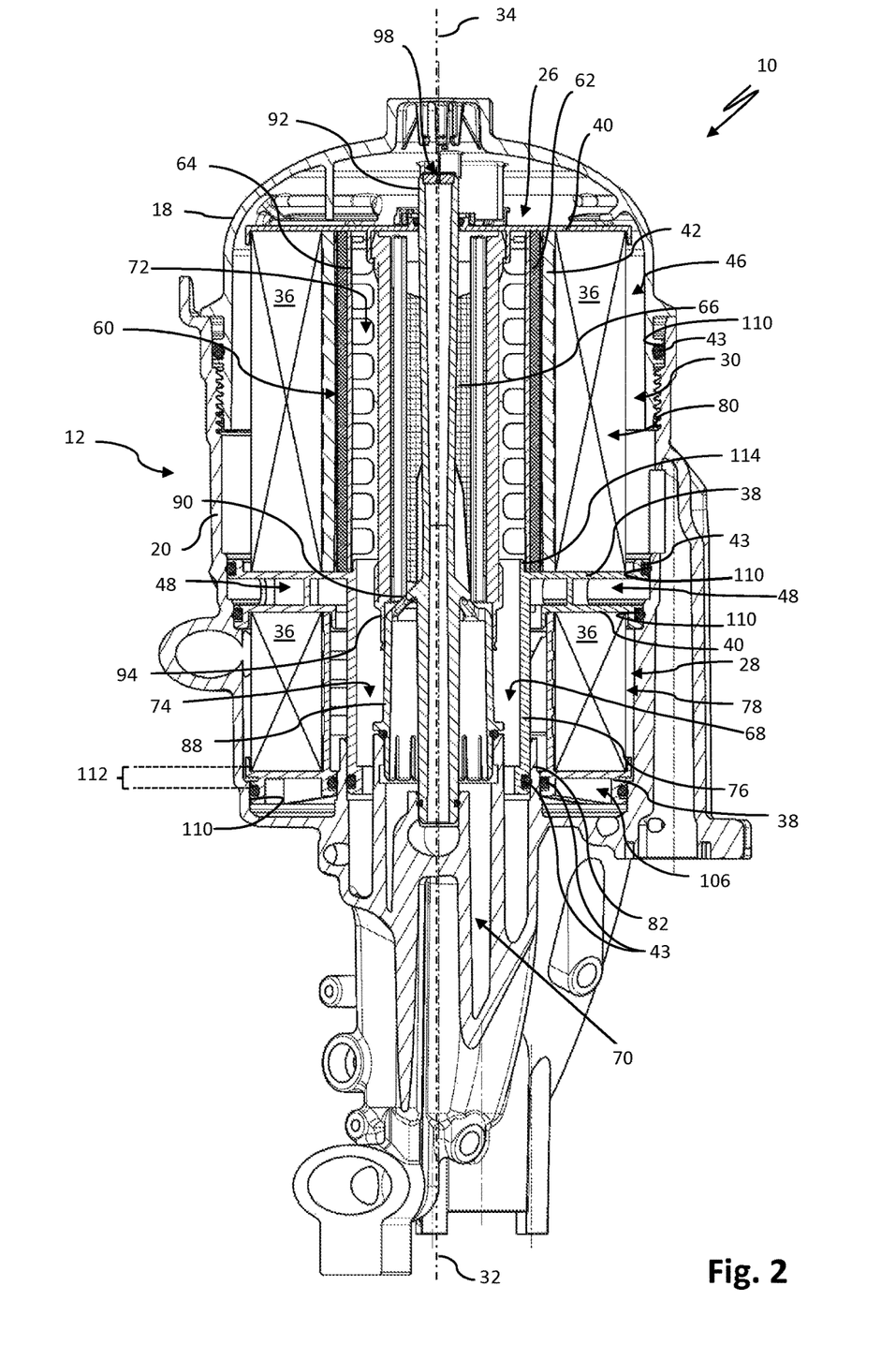
FIG. 2 shows the fuel filter of FIG. 1 in a longitudinal section view.

In the FIGS. 1 and 2, a fuel filter 10 for filtering out contaminants contained in fuel, in particular diesel fuel, is illustrated. The fuel filter 10 is suitable, for example, for use in commercial vehicles with internal combustion engine.

The fuel filter 10 comprises an openable filter housing 12 with a filter cup 14 with an insertion opening 16 and with a housing cover 18 for closing off the filter cup 14. The filter cover 18 can be screwed into the filter cup 14. A different type of attachment of the filter cover 18 on the filter cup 14 is conceivable. The filter housing 12 can be comprised, for example, of metal or of a plastic material. At the lower end of the filter housing 12, a so-called filter head 20 is formed. The fuel filter 10 is thus designed in a generally known manner for an upright arrangement in operation.

The filter housing 12 comprises a fuel inlet 22 which serves for supplying the fuel to be filtered, for example, from a fuel tank (not illustrated), to the fuel filter 10. A fuel return 24 of the filter housing serves for returning contaminated fuel, e.g., to the aforementioned fuel tank.

In the interior of the filter housing 12, a fuel filter insert 26 is arranged. The fuel filter insert 26 comprises a prefilter element 28 and a main filter element 30. The two filter elements 28, 30 are arranged in the direction of the longitudinal axis 32 of the fuel filter one atop the other in the filter housing 12. The longitudinal axis 32 of the fuel filter coincides with the longitudinal axis 34 of the fuel filter insert 26. The main filter element 30 is fluidically arranged downstream of the prefilter element 28. In other words, in operation the fuel to be filtered flows presently first through the prefilter element 28 arranged at the bottom in the filter housing 12 and subsequently through the main filter element 30 which is arranged above the prefilter element 28.

The prefilter element 28 and the main filter element 30 each are designed as round filter elements with a filter medium 36 which is annularly arranged relative to the longitudinal axis 34 of the fuel filter insert 26. The filter medium 36 of the prefilter element 28 as well as of the main filter element 30 can be flowed through, respectively, by the fuel to be filtered in a radial direction relative to the longitudinal axis 34 of the fuel filter insert 26 from the exterior to the interior. The filter media 36 each are embodied as a filter bellows folded in a star shape and are secured between a lower and an upper end disc 38, 40 of the respective filter element. The upper end disc 40 of the main filter element 30 can be detachably coupled or is detachably coupled by a bayonet connection 41 (snap connection or something similar) with the housing cover 18. For radial inner support of the filter media 36 of the prefilter element 28 as well as of the main filter element 30, a grid-shaped support tube 42 is provided, respectively. The filter media 36 are resting inwardly on the respective support tube 42, preferably immediately.

The end discs 38, 40, correlated with each other, of the prefilter element and of the main filter element, i.e., the lower end disc 38 of the main filter element 30 and the upper end disc 40 of the prefilter element 28, are arranged spaced apart from each other in axial direction. These two end discs 38, 40 are resting sealingly (fluid-tightly) by sealing elements 43 against the inner side of the filter housing 12, respectively. The two end discs 38, 40 serve therefore as sealing discs by means of which the interior of the filter housing 12 in axial direction is divided into a prefilter chamber 44 comprising the prefilter element 28 and a main filter chamber 46 comprising the main filter element 30. Between the upper end disc 40 of the prefilter element 28 and the lower end disc 38 of the main filter element 30, a flow channel 48 for the fuel that has been prefiltered by the prefilter element 28 is arranged. The flow channel 48 is immediately delimited in axial direction by the end discs 38, 40, correlated with each other, of the prefilter element 28 and main filter element 30.

The upper end disc 40 of the prefilter element 28 and the lower end disc 38 of the main filter element 30 are connected to each other for common removal of the main filter element 30 and prefilter element 28, in particular are formed together as one piece and can be embodied in particular as injection molded plastic part. As can be seen in FIGS. 1 and 2, between the two end discs distance elements 50 are arranged that are connected to the two end discs 38, 40, respectively, in particular integrally formed thereon.

The flow channel 48 is substantially embodied in annular configuration and in radial direction is fluidically connected with the inner wall 52 of the filter housing 12. The flow channel 48 at the outlet side is fluidically connected to a laterally (radially) arranged fuel outlet 54 of the filter housing 12. A fuel pump 56 is connectable to the fuel outlet 54. The fuel pump 56 serves to suck the contaminated fuel into the prefilter chamber 44 and through the prefilter element 28 and to pump the prefiltered fuel that has been guided out of the filter housing 12 by means of the fuel inlet 58 of the filter housing 12 into the main filter chamber 46 of the filter housing 12 again. This is done in order to guide the prefiltered fuel through the filter medium 36 of the main filter element 30. The fuel inlet 58 is arranged axially displaced relative to the fuel outlet 54 of the filter housing 12.

The main filter element 30 comprises a water separating unit 60 for separating water contained in the fuel. The water separating unit 60 comprises a coalescing medium 62 that is arranged in an annular shape about the longitudinal axis 34 of the fuel filter insert 26. The coalescing medium 62, as shown in FIGS. 1 and 2, is arranged in particular fluidically downstream of the filter medium 36 of the main filter element 30. In this context, the coalescing medium 36 is resting advantageously inwardly against a central tube 64 so that it does not collapse when it is loaded with pressure in operation of the fuel filter 10. The central tube 64 is arranged inside the support tube 42 and coaxial to the longitudinal axis 34 of the fuel filter insert 26. The coalescing medium 62 is thus arranged between the central tube 64 and the support tube 42 of the filter medium 36 of the main filter element 30. The coalescing medium 62, as needed, can be embodied as a single layer or multi-layered and can be comprised of a nonwoven, for example.

As can be seen in FIGS. 1 and 2, a screen tube 66 is arranged within the central tube 64. The screen tube 66 serves functionally as a final separator for the water contained in the fuel. The screen tube 66 is arranged so as to extend coaxially relative to the longitudinal axis 34 of the fuel filter insert 26. The interior of the screen tube 66 is fluidically connected by a fuel discharge channel 68 extending in axial direction partially through the prefilter element 28 with a fuel channel 70 of the filter housing 12. The fuel which has been filtered by the prefilter element 28 and main filter element 30 and from which water has been removed at least partially flows in operation from the interior of the screen tube 66 through the fuel discharge channel 68 and the fuel channel 70 of the filter housing 12 in downward direction out of the fuel filter insert 26.

An annular water separating gap 72 is formed between the screen tube 66 and the coalescing medium 62 or the central tube 64. The water separating gap 72 is configured to be open in downward direction and is fluidically connected with one end with a water discharge channel 74 extending lengthwise.

At the lower end disc 38 of the main filter element 30, a substantially tubular wall element 76 is attached, in particular integrally formed thereat, which in axial direction is extending away from the lower end disc 38 of the main filter element 30 in the direction of the filter head 20, i.e., in downward direction. The wall element 76 extends in axial direction to the level of the lower end disc 38 of the prefilter element 28 into the prefilter element. The wall element 76 delimits the prefilter chamber 44 in radial direction on the inner side and separates it relative to the water discharge channel 74 of the fuel filter insert 26. In other words, the water discharge channel 74 for the water separated from the fuel is immediately delimited outwardly in radial direction by the tubular wall element 76.

As a whole, the wall element 76 thus separates from each other a low-pressure region 78, comprising the prefilter element 28, and a high-pressure region 80, comprising the main filter element 30, of the fuel filter insert 26.

The water discharge channel 74 in axial direction can be extending entirely or partially through the prefilter element 28 and is fluidically connected by a housing socket or water discharge socket 82 of the filter housing 12 with a water discharge channel or water collecting chamber 84 of the filter housing 12.

The tubular wall element 76 and the lower end disc 38 of the prefilter element 28 delimit together a receiving slot 86 into which the housing socket or water discharge socket 82 is projecting seal-tightly in axial direction. The wall element 76 is resting seal-tightly by a sealing element 43 on an inner side of the water discharge socket 82 and the lower end disc 38 of the prefilter element 28 by a further sealing element 43 on the exterior side of the water discharge socket 82. In this way, the low-pressure region or the prefilter chamber 44 is sealed relative to the high-pressure region or the water discharge channel 74.

In radial direction, the water discharge channel 74 is delimited on the inner side by a tubular element 88. The tubular element 88 forms at the same time a radial outward boundary of the fuel discharge channel 68. One end of the tubular element 88 is integrally formed on a centrally arranged venting tube 92 of the fuel filter 10 by means of a connecting section 90 that is extending at a slant relative to the longitudinal axis 34 of the fuel filter insert 26 and is fenestrated (not illustrated). Alternatively, the tubular element can also be formed as a part of the screen tube 66 of the fuel filter insert 26.

A free end section of the screen tube 66 is formed as a sealing lip or as a sealing collar 94 and is resting seal-tightly on the exterior of the tubular element 88 about the entire circumference. The tubular element 88 of the venting tube 92 with the other end, i.e., its lower end, is locked (or screw-connected) with a fuel discharge socket 96 of the filter housing 12 and is resting on the inner side seal-tightly against it by means of a sealing element 43.

The venting tube 92 serves for venting the main filter element 30 or the main filter chamber 46 and extends coaxially to the longitudinal axis 34 of the fuel filter insert through the latter. The venting tube 92 with its inlet opening 98 at one end can axially project past the upper end disc 40 of the main filter element 30. The inlet opening 98 of the venting tube 92 in this case is arranged between the upper end disc 40 of the main filter element 30 and the housing cover 18. It is understood that the venting tube 92 can also be arranged flush or substantially flush with the upper end disc 40 of the main filter element 30. The venting tube 92 projects seal-tightly with the other end into a venting socket 100 of the filter housing 12. The venting socket 100 can be fluidically connected with the fuel return 24 of the filter housing 12. In operation of the fuel filter 10, in the region of the main filter chamber 46 air that is contained in the fuel or degassed substances of the fuel can be evacuated thus by means of the venting tube 92 and the fuel return 24 of the filter housing 12 out of the filter housing 12. For safety reasons, the venting tube 92 can be provided with a throttle 102, for example, in the region of its inlet opening 98.

The prefilter chamber 44 is delimited in downward direction by a housing bottom 104 of the filter housing 12. In its illustrated mounted state, the prefilter element 28 is arranged axially spaced apart from the housing bottom 104. In this way, between the lower end disc 38 of the prefilter element 28 and the housing bottom 104 a fuel discharge channel 106 is formed or defined. The fuel discharge channel 106 surrounds the longitudinal axis 34 of the fuel filter housing 12 and is open toward the fuel return 24 of the filter housing 12, i.e., is fluidically connected therewith.

The filter cup 14 comprises an inner cross section which is tapering axially in the direction toward the housing bottom 104, i.e., in the insertion direction 108 of the fuel filter insert 26, in a step-wise manner. In this way, the filter housing 12 comprises sealing surface sections 110 in the region of its inner wall 52 for the seal-tight contact of the end discs 38, 40 of the fuel filter insert 26. The sealing surface sections 110 are spaced less far relative to the longitudinal axis 34 of the fuel filter element 26 with increasing spacing from the insertion opening 16 of the filter housing 12 in the direction toward the housing bottom 104. In a manner corresponding therewith, the sealing elements 43 of the lower end disc 38 of the main filter element 30 as well as of the two end discs 38, 40 of the prefilter element 28 are differently spaced apart from the longitudinal axis 34 of the fuel filter insert 26 and are resting seal-tightly against the sealing surface sections 110 of the filter cup 14 in the illustrated operating position of the fuel filter insert 26 in the filter housing 12. In this way, the fuel filter insert 26 can be inserted in a simplified manner and without unnecessary overstressing of its sealing elements 43 into its operating position in the filter housing.

For an exchange of the fuel filter insert 26, the latter is moved axially out of the filter cup 14 opposite to the insertion direction 108. As soon as the fuel filter insert 26 has been moved by an axial travel stroke 112 (see FIG. 2) from its illustrated installed position into a drainage position, the sealing elements 43 of the lower and the upper end discs 38, 40 of the prefilter element 28 as well as of the lower end disc 38 of the main filter element 30 are removed from their respective sealing position on the filter housing 12 or the water discharge socket 82. Accordingly, the main filter chamber 46 is fluidically connected via the prefilter chamber 44 with the fuel discharge channel 106. In this way, the raw-side fuel can flow from the main filter chamber 46 through the prefilter chamber 44, together with the raw-side fuel contained therein, into the fuel discharge channel 106, following the force of gravity. Through the fuel discharge channel 106, the fuel can flow to the fuel return 24.

It should be noted that the axial length of the housing-associated water discharge socket 82 is dimensioned such that the sealing element 43 of the wall element 76 in the drainage position of the fuel filter insert 26 is still seal-tightly contacting the water discharge socket 82. In this way, it is ensured that the fuel from the prefilter chamber 44 does not reach the clean side of the fuel filter 10, here the water discharge (socket) or the fuel discharge socket 96 of the fuel channel 70.

Figure 3:
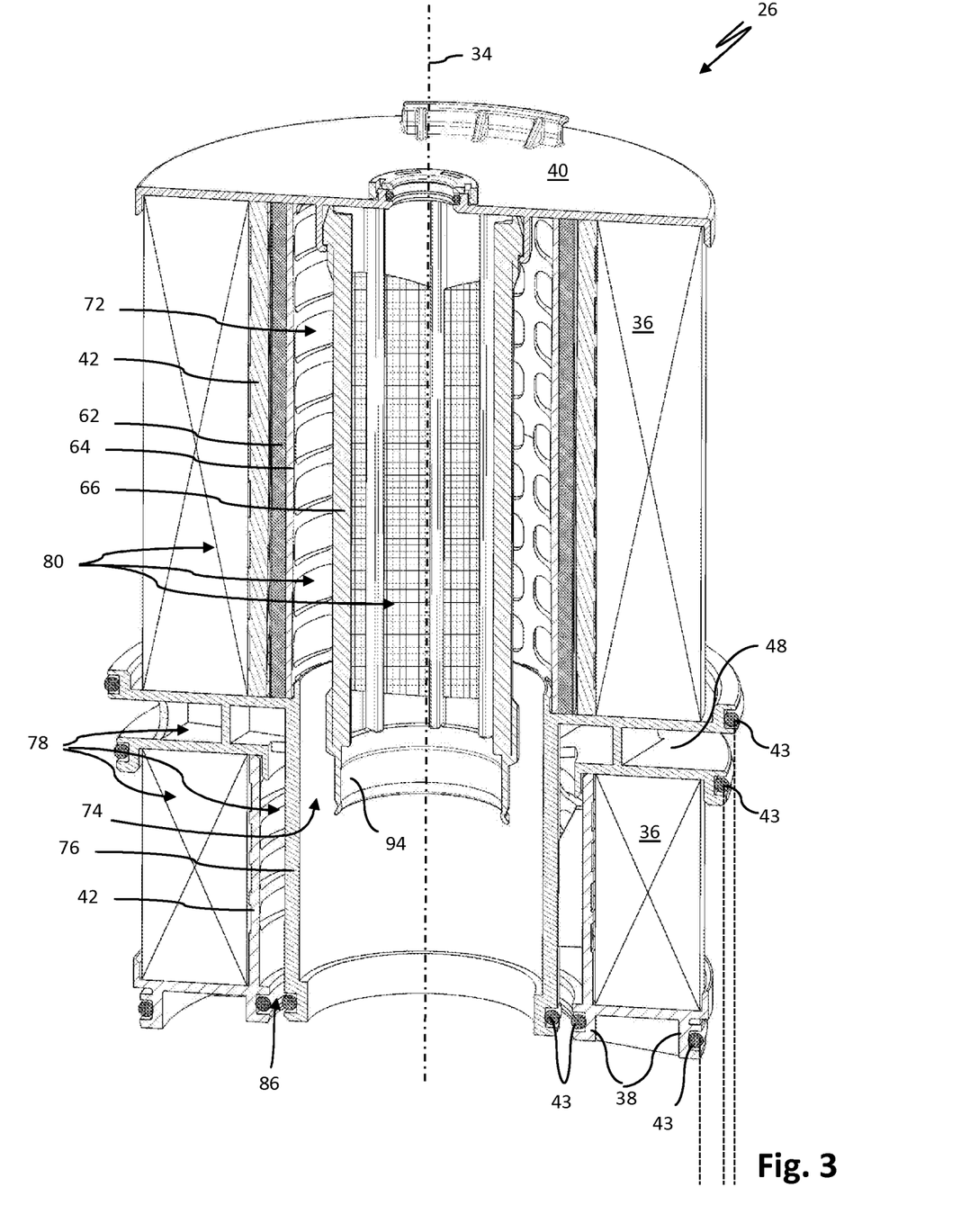
FIG. 3 shows the filter insert of FIG. 1 in an exposed section illustration.

FIG. 3 shows the fuel filter insert of FIGS. 1 and 2 in an exposed illustration and in a longitudinal section. The grid structure of the screen tube 66 can be seen clearly in this illustration. The screen tube 66 is connected, e.g., locked, with the upper end disc 40 of the main filter element 30. The sealing collar 94 of the screen tube can be comprised of an elastically deformable (plastic) material. The sealing collar 94 can thus be pushed seal-tightly onto the tubular element 88 upon axially oriented introduction of the fuel filter insert 26 into the filter housing 12 (FIGS. 1 and 2) by being guided on the slantedly extending connecting section 90 of the venting tube 92. The lower end disc 38 of the main filter element 30 comprises at the inner circumference a holding stay 114. The holding stay 114 is axially projecting away from the lower end disc 38 in the direction of the upper end disc 40 of the main filter element 30 and supports the central tube 64 on the inner side.

In operation of the fuel filter 10, the unfiltered fuel that is sucked in by the fuel pump flows through the fuel inlet 22 of the filter housing 12 into the prefilter chamber 44 and passes through the filter medium 36 of the prefilter element 28 in radial direction from the exterior to the interior. Due to the tubular wall element 76 of the main filter element 30, the fuel flows via the flow channel 48 and the lateral fuel outlet 54 of the filter housing into the fuel pump 56. By means of the fuel pump 56, which is fluidically interconnected between the fuel outlet 54 and the fuel inlet 58, the prefiltered fuel is pumped into the main filter chamber 46 of the filter housing 12. The prefiltered fuel flows through the filter medium 36 of the main filter element 30, the coalescing medium 62, and the screen tube 66 in a radial direction relative to the longitudinal axis 34 of the fuel filter insert 26 from the exterior to the interior. In doing so, the water contained in the fuel is at least partially separated from the fuel and flows, following the force of gravity, from the water separating gap 72 through the water discharge channel 74 in downward direction into the water collecting chamber 84 of the filter housing 12. The fuel, from which contaminants have been removed in this way, flows through the fuel channel 70 out of the fuel filter 10 and can be supplied to an internal combustion engine or a fuel injection pump.

For exchange of the fuel filter insert 26, in a first step the housing cover 18 is removed from the filter cup 14. The bayonet connection 41 between the housing cover 18 and the fuel filter insert 26 is closed or becomes closed due to the screwing movement of the housing cover 18. The fuel filter insert 26 as a whole is moved due to the screwing movement axially in the direction of the longitudinal axis 32 of the filter housing 12 out of its installation position (FIGS. 1 and 2). As soon as the fuel filter insert 26 is in the drainage position, the raw-side (prefiltered) fuel flows out of the main filter chamber 46 of the filter housing 12 into the prefilter chamber 44 and, together with the raw-side fuel contained therein, flows via the fuel discharge channel 106 into the fuel return 24 as well as, as the case may be, into a fuel tank fluidically connected therewith. Upon further unscrewing or lifting off of the housing cover 18 from the filter cup 14 together with the fuel filter insert 26, the inner sealing element 43 of the wall element 76 as well as the sealing element 43 of the lower end disc 38 of the prefilter element 28 which is contacting the water discharge socket 82 are also moved out of their seal-tight contact at the water discharge socket 82. A possibly present liquid level of a fuel water mixture at the clean side can then flow in radial direction outwardly into the fuel discharge channel 106 and can flow out of the filter housing 12 via the fuel return 24. After complete removal of the fuel filter insert 26 from the filter cup 14, it is decoupled from the housing cover 18 and a new fuel filter insert 26 is fastened to the housing cover 18. The fuel filter insert 26 is inserted subsequently in the insertion direction into the filter cup 14 and, by screwing the housing cover 18 onto the filter cup 14, is transferred into its installation position (FIGS. 1 and 2).

What is claimed is:

1. A fuel filter comprising:
   a filter housing;
   a fuel filter insert exchangeably arranged in the filter housing and comprising
      a prefilter element and
      a main filter element arranged axially above the prefilter element, in the filter housing in an axial direction of a longitudinal axis of the filter housing;
   a fuel discharge channel arranged in the filter housing below the fuel filter insert;
   wherein, in an operating position of the fuel filter insert in the filter housing, a raw side of the prefilter element and a raw side of the main filter element are sealed relative to the fuel discharge channel by seal-tight contact of the fuel filter insert on the filter housing;
   wherein the raw side of the main filter element, when the fuel filter insert is moved by an axially oriented movement away from the operating position in the filter housing, is fluidically connected with the fuel discharge channel via the raw side of the prefilter element;
   wherein the fuel filter insert comprises:
      a flow channel for fuel prefiltered by the prefilter element,
      wherein the flow channel is arranged between the prefilter element and the main filter element and in the axial direction is immediately delimited by an end disc of the prefilter element and by an end disc of the main filter element that is facing the end disc of the prefilter element;
   wherein the filter housing comprises a lateral fuel outlet and a fuel inlet;
   wherein the flow channel is fluidically connected by the lateral fuel outlet to a fuel pump in order to pump the fuel prefiltered by the prefilter element through the fuel inlet to the main filter element.

2. The fuel filter according to claim 1, wherein the filter housing comprises
   a fuel return,
      wherein the fuel discharge channel is fluidically connected with the fuel return of the filter housing in order to return fuel from the filter housing to a fuel tank.

3. The fuel filter according to claim 1, wherein the prefilter element comprises
   at least one end disc and
   wherein the main filter element comprises
   at least one end disc,
   wherein the fuel filter insert in the operating position in the filter housing is seal-tightly contacting an inner side of the filter housing with the at least one end disc of the main filter element and with the at least one end disc of the prefilter element.

4. The fuel filter according to claim 1, wherein the filter housing comprises
   a filter cup with an inner wall that tapers in steps from an insertion opening of the filter housing in a direction toward a housing bottom of the filter housing.

5. The fuel filter according to claim 1, wherein the end disc of the prefilter element and the end disc of the main filter element that is facing the end disc of the prefilter element are connected to each other for common removal of the main filter element and the prefilter element.

6. The fuel filter according to claim 5, wherein the end disc of the prefilter element and the end disc of the main filter element that is facing the end disc of the prefilter element are formed together as one piece.

7. The fuel filter according to claim 1, wherein the fuel filter insert comprises
a low-pressure region in which the prefilter element is arranged and
further comprises a high-pressure region in which the main filter element is arranged,
wherein the fuel filter insert further comprises a wall element extending from the main filter element in the axial direction at least partially through the prefilter element and separating the main filter element and the prefilter element form each other at least over sections thereof.

8. The fuel filter according to claim 7, wherein the wall element comprises
one end attached to an end disc of the main filter element.

9. The fuel filter according to claim 7, wherein the end of the wall element is integrally formed on the end disc of the main filter element.

10. The fuel filter according to claim 1, further comprising a water separating unit configured to separate water contained in a fuel to be filtered.

11. The fuel filter according to claim 10, wherein the filter housing comprises
a water collecting chamber,
wherein the water separating unit comprises
a water separating gap fluidically connected by a water discharge channel to the water collecting chamber of the filter housing,
wherein the water discharge channel is extending at least with sections thereof through the prefilter element in the axial direction.

12. The fuel filter according to claim 11, wherein the fuel filter insert further comprises
a wall element extending from the main filter element in the axial direction at least partially through the prefilter element and separating the main filter element and the prefilter element from each other at least over sections thereof,
wherein the water discharge channel is delimited in a radial direction outwardly by the wall element.

13. The fuel filter according to claim 12, wherein the prefilter element comprises
an end disc that is facing away from the main filter element,
wherein the wall element together with said end disc of the prefilter element delimits a receiving slot,
wherein the filter housing comprises a water discharge socket that is extending seal-tightly into the receiving slot.

14. The fuel filter according to claim 11, further comprising
a venting tube with a tubular element,
wherein the water discharge channel is delimited in a radial direction inwardly by the tubular element of the venting tube.

15. The fuel filter according to claim 14, wherein the venting tube is fastened to the filter housing.

16. The fuel filter according to claim 15, wherein the venting tube has an end that opens into a fuel return configured to return fuel to be filtered to a fuel tank.

17. The fuel filter according to claim 15, wherein the venting tube is locked to the filter housing or is screwed to the filter housing.

18. The fuel filter according to claim 11, wherein the water separating unit further comprises
a screen tube,
wherein the water discharge channel is delimited in a radial direction inwardly by the screen tube.

19. A fuel filter insert for a fuel filter that comprises a filter housing and a fuel discharge channel arranged in the filter housing,
the fuel filter insert comprising:
a prefilter element having a first end disc; and
a main filter element having a second end disc, the main filter element arranged axially spaced apart above the prefilter element forming a flow channel therebetween, the first end disc of the prefilter element spaced apart from and connected directly to the second end disc of the main filter element by at least one distance element formed as at least one rib which bridges axially through the flow channel and connects the first end disc to the second end disk;
a tubular wall element formed on the second end disc of the main filter element, the tubular wall element extending axially through a central opening in the first end disc of the prefilter element and into an interior of the prefilter element;
wherein the fuel filter insert is configured to be inserted into the filter housing in an operating position such that a raw side of the prefilter element and a raw side of the main filter element are sealed relative to the fuel discharge channel by seal-tight contact of the fuel filter insert on the filter housing,
wherein the fuel filter insert is configured such that the raw side of the main filter element, when the fuel filter insert is moved by an axially oriented movement away from the operating position in the filter housing, is fluidically connected with the fuel discharge channel via the raw side of the prefilter element.

* * * * *